July 2, 1929.    M. A. SWEET ET AL    1,719,281
DIAL SCALE PRINTING DEVICE
Filed Dec. 12, 1919    3 Sheets-Sheet 1

Inventors.
Melvin A. Sweet
George W. Britton
by H. J. S. Dennison atty.

July 2, 1929.　　M. A. SWEET ET AL　　1,719,281
DIAL SCALE PRINTING DEVICE
Filed Dec. 12, 1919　　3 Sheets-Sheet 2
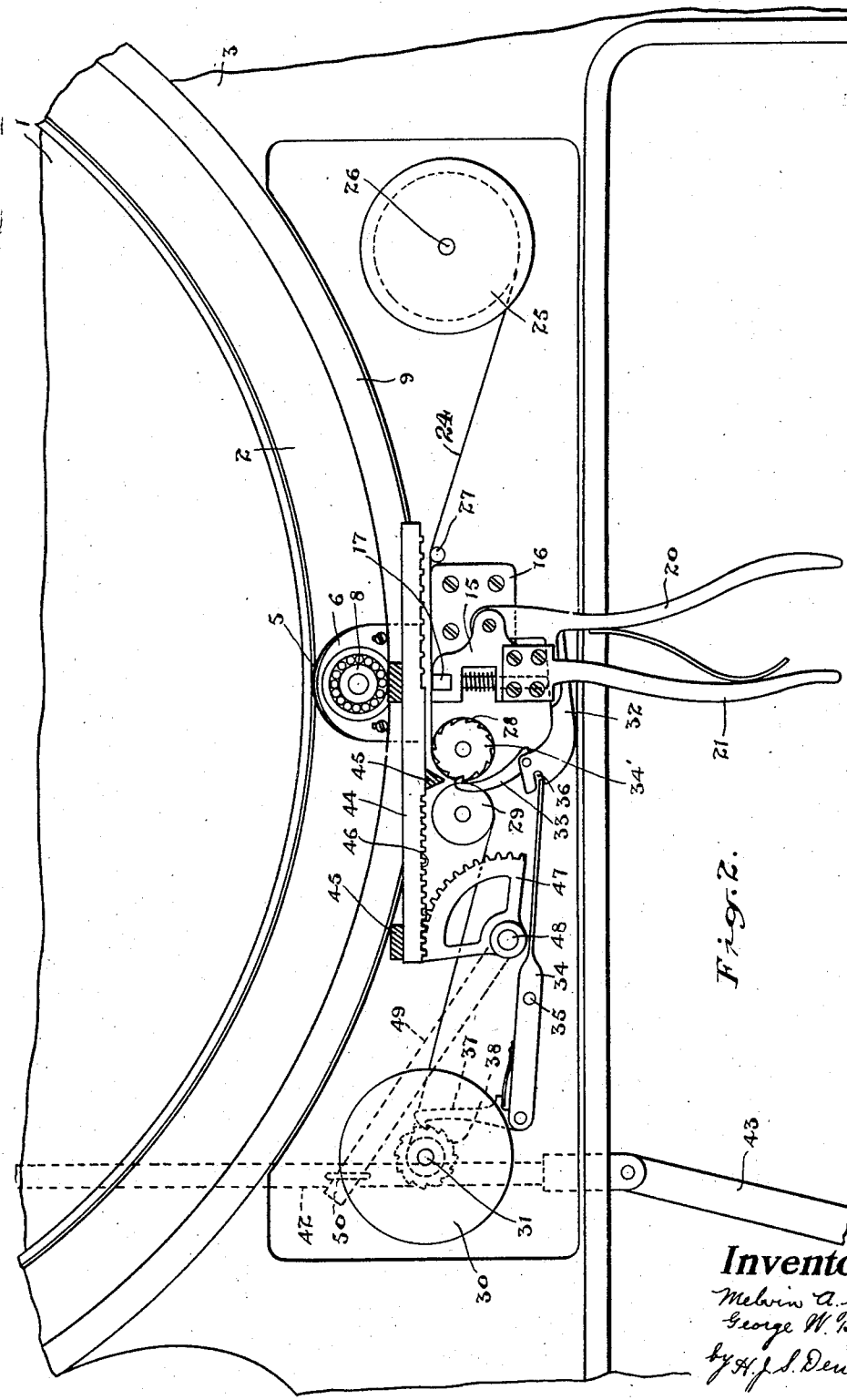
Inventors.
Melvin A. Sweet.
George W. Britton.
by H. J. S. Dennison atty.

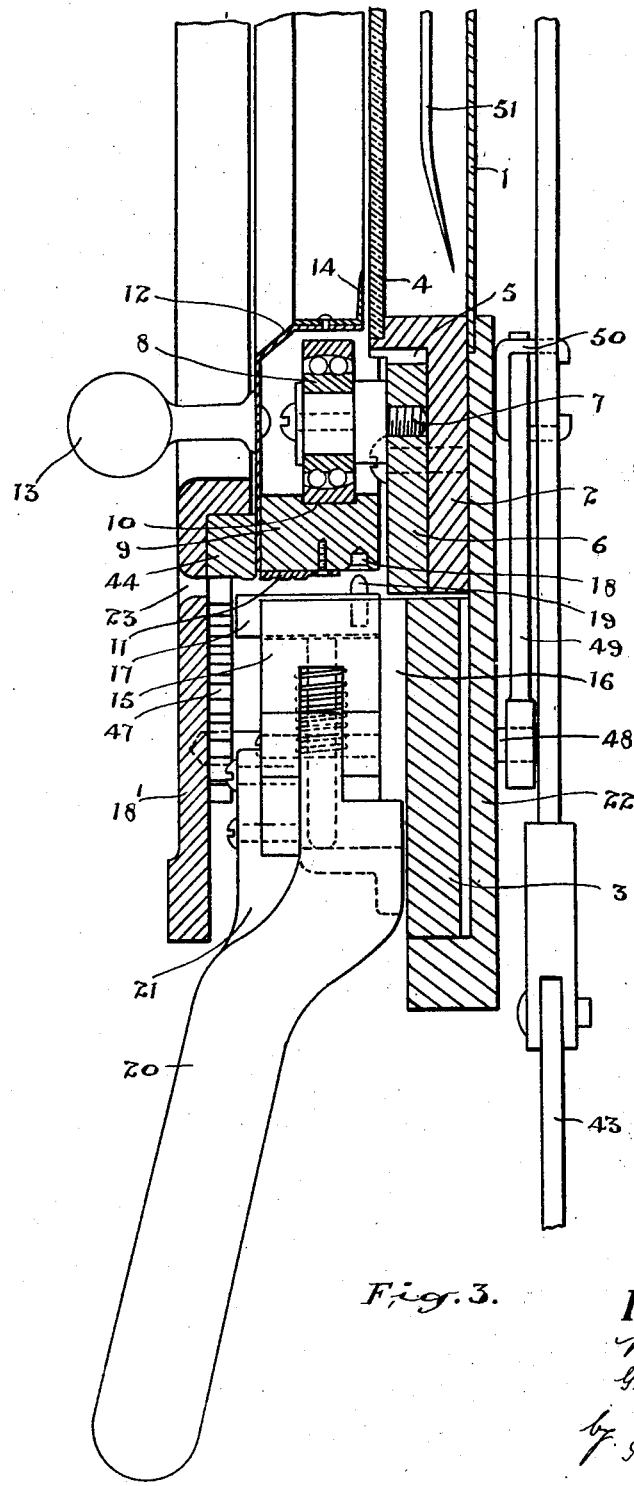

Patented July 2, 1929.

1,719,281

UNITED STATES PATENT OFFICE.

MELVIN ARVINE SWEET AND GEORGE WILLIAM BRITTON, OF HAMILTON, ONTARIO, CANADA, ASSIGNORS TO TYPE REGISTERING SCALE COMPANY, LIMITED, OF HAMILTON, ONTARIO, CANADA.

DIAL SCALE PRINTING DEVICE.

Application filed December 12, 1919. Serial No. 344,427.

The principal objects of this invention are, to facilitate the indication and registration of weights taken from dial scales by the printing of the weight upon a card and to maintain a complete record of the operation of the scale so that the total weights registered may be readily ascertained.

A further object is to devise a construction of apparatus which will be extremely simple and accurate in operation and which may be operated with ease.

The principal feature of the invention consists in the arrangement of indicating characters upon a member rotatable in relation to the dial with means for obtaining an impression from said characters corresponding with the registration of the dial, and whereby a duplicate record of the printed characters is obtained.

In the drawings, Figure 1 is a front elevational view of a dial scale equipped with our improved printing device.

Figure 2 is an enlarged front elevational view of the printing and recording mechanism.

Figure 3 is an enlarged vertical cross sectional view, showing the dial frame, printing ring and covering casings.

Figure 1:
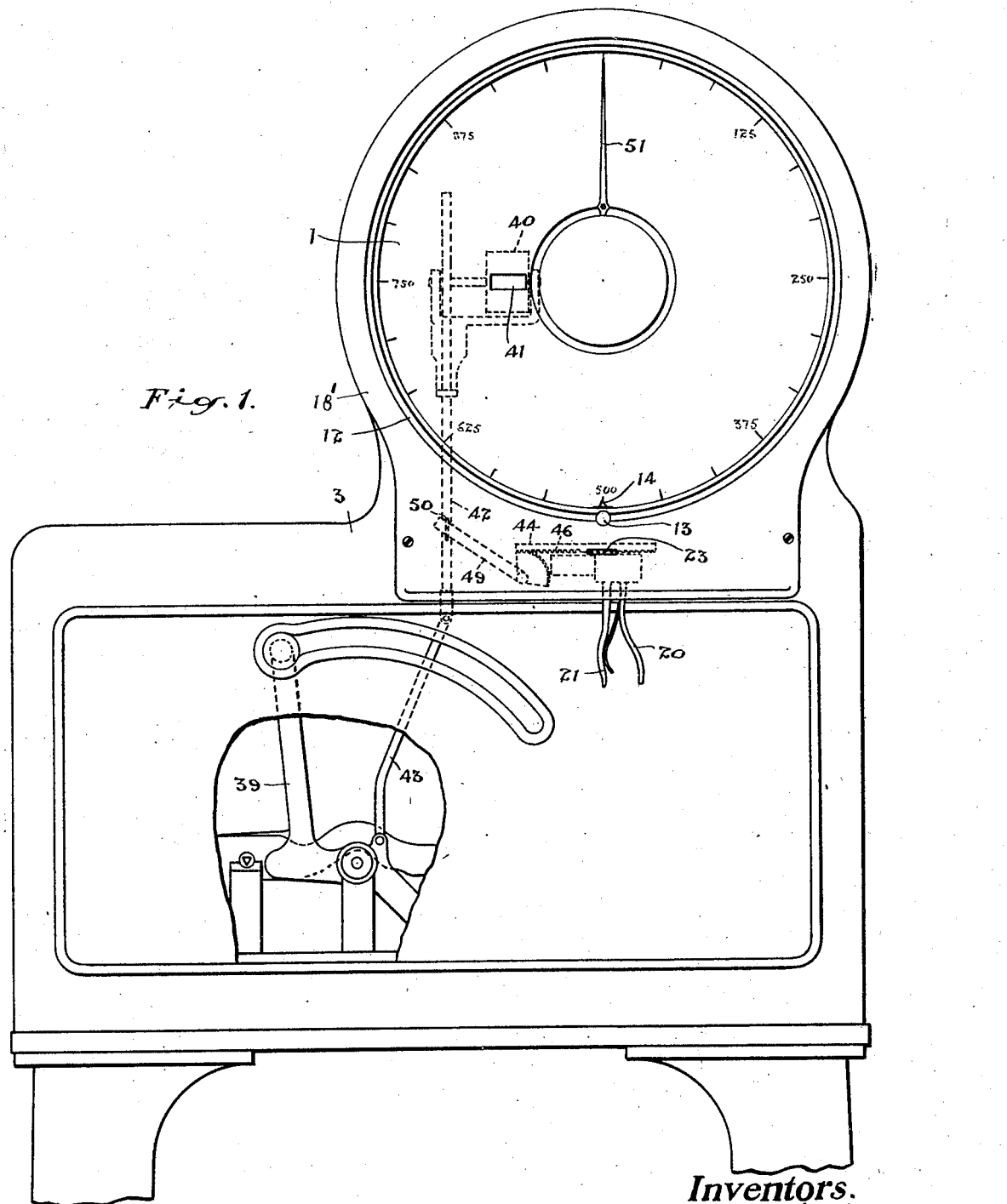

In the use of weigh scales it is desirable to not only have a printed indication of the weights registered upon cards but it is desirable to retain a secret record of all weights taken off the scale.

The printing of cards has been previously proposed in connection with dial scales in a Patent No. 1,461,949 granted July 17, 1923 and the present invention has a two fold object, first to simplify the printing of the weights registered on a dial scale by rotating the printing characters in relation to the dial instead of moving the printing device around the dial, and second, to obtain a complete record of the weights registered.

In the application of this invention herein shown the dial 1 is supported by a circular frame 2 forming part of the main frame 3 in which the weighing mechanism is arranged. A glass 4 is secured in the frame 2 covering the dial. The frame 2 is formed with pockets 5, preferably four in number in the outer side and in these pockets are arranged the radially adjustable blocks 6. To each of the blocks 6 is secured a pin 7 upon which is mounted a ball bearing roller 8.

A ring 9 is rotatably supported upon the rollers 8, having a groove 10 in its inner periphery into which the rollers extend. Upon the outer periphery of the ring 9 are secured the type characters 11 which correspond with the weights indicated upon the dial. A ring shape cover casing 12 of sheet metal is secured to the type ring 9 and extends close into the glass 4, covering the roller supports. To this casing is secured a handle 13 by means of which the type ring is rotated and a pointer 14 extends inwardly from said casing, it being so arranged in relation to the type that when the finger is moved around the dial the type characters corresponding with the dial characters will be arranged opposite to the impression device.

Any suitable form of impression device may be used to press a card into contact with the type surface of the ring 9 but the form herein shown consists of a block 15 rigidly secured to the supporting plate 16 which is carried by the frame 3 and in this block is arranged a reciprocating plunger 17 which is adapted to move into engagement with the type face of the type ring.

The ring 9 is formed with a row of holes 18 one being arranged in transverse alignment with each character on the ring and a taper pin 19 is secured in the plunger head 17 so that when an impression is to be made the pin enters one of the holes and first brings the type to definite alignment with the plunger and locks the ring during the printing operation. The plunger is spring held clear of the type and is operated by a lever 20 pivotally connected to the block 15.

A rigid handle 21 is secured to the block 15, forming a grip for the operator in operating the lever. The outer cover plate 18' which encloses the printing mechanism is provided with a slot 23 to allow of the insertion of a registering card upon which the registered weight is to be printed. Duplicate cards can be used if desired but it is desirable that a complete record of the weights be kept and in order to accomplish this result, we have provided a paper recording strip 24. A blank roll 25 is mounted upon a pin 26 and the paper strip passes over a guide roller 27 and between the plunger 17 and the type ring 9 and then between the engaging feed rolls 28 and 29 to the winding roll 30 mounted on the pin 31.

The plunger operating lever 20 is provided with a rigid arm 32 upon the end of which is arranged a ratchet pawl 33 which engages with a ratchet wheel 34' arranged on one end of the feed roll 28.

When the lever 20 is operated to make an impression the pawl moves upwardly over one of the teeth of the ratchet wheel and when the lever is released the arm 32 operated by the plunger spring operates the pawl to rotate the feed roll and to draw the paper strip the required distance to bring a clean portion of the strip opposite the plunger.

A spring arm 34 is pivotally mounted intermediate of its length upon a pin 35 and one end of said arm extends into a notch 36 in the arm 32 so that when the plunger is operated the arm 34 tilts on its pivot. A pawl 37 is mounted on the opposite end of the arm 34 and is spring held in contact with a ratchet wheel 38 on the winding roll 30. The operation of the arm 34 takes up the slack of the paper strip and when the tension on the paper exceeds the strength of the spring arm it simply bends to allow the plunger to operate without moving the winding roll and thus automatically allows for the varying diameter of the paper on the winding roll.

The dial scale is provided with a mechanism for placing counter weights upon the scale beam, which mechanism is operated by a lever 39 and an indicating drum 40 is arranged back of the dial and displays indicating numerals through the opening 41, the operation being in a scale registering a thousand pounds on the dial, if a load of over a thousand pounds is placed on the scale the lever 39 is operated to place a counter weight on the beam and the drum 40 is rotated to indicate one thousand and the dial finger indicates the excess, and so on. The drum is operated by a gear mechanism operated by a reciprocating rod 42 which rod is connected by a link 43 with the counter weight lever 39.

The type ring carries only such characters as represented on the dial and when an additional counter weight is added it is necessary to provide a corresponding printing character.

This result is accomplished in the form of the device shown by the arrangement of a horizontally slidable bar 44 supported between the guides 45 on the inner side of the cover plate 22. The underside of the bar is provided with characters 1 to 9 arranged in transverse alignment with the characters on the type ring 9, thus adding another numeral to the number indicated on the dial. The added numeral must coincide with the indication of the drum 40 and to accomplish this the bar 44 is formed with a gear rack 46. A quadrant gear 47 secured to a shaft 48 meshes with the rack 46 and upon the rotation of the quadrant the rack is moved longitudinally.

The shaft 48 extends through the frame 2 and upon the inner end is secured a lever 49. This lever extends to intersect the drum operating rod 42 and a sliding operating connection is effected by means of a loop member 50 through which the lever extends.

In the operation of this scale, when the load is placed upon the platform the dial finger 51 moves over the surface to indicate the weight. The operator then rotates the ring 9 by means of the handle 13 to bring the pointer 14 opposite to the finger 51. The numeral corresponding with the numeral on the dial will then be in alignment with the plunger 17. The weight ticket is then inserted through the slot 23 and the operator gripping the lever 20 and handle 21 operates the plunger and simultaneously prints upon the ticket and the recording paper strip 24. The ticket is then withdrawn and a record of the weight is retained on the strip. The release of the printing lever operates the paper feed mechanism a uniform distance each time an impression is made and the record is thus clear and equally spaced.

When a load greater than the capacity of the dial is to be weighed the lever 39 is operated to place the desired counter weights on the scale beam, which mechanism is not shown as it has no bearing on the present invention, and the type bar 44 is operated to bring the proper numeral into position through the mechanism described.

The recording printing mechanism is herein shown and described in connection with a rotatable type ring but it must be understood that it may be readily adapted to use with a stationary type surface without departing from the spirit of the invention.

What we claim as our invention is:—

1. In a dial scale printing device, the combination with a fixed dial and an axially rotatable indicator, of a ring rotatable about said dial independent of the weighing mechanism and having a pointer to register with the weight indicator, and having type rigid on its periphery, and a printing device adapted to press against the type.

2. In a dial scale printing device, the combination with the circular dial frame and an impression member, of a type ring rotatably mounted in said frame for rotation independent of the scale weighing mechanism, said ring having type rigidly secured on its periphery coinciding with the dial markings and adapted to co-operate with said impression member.

3. In a dial scale printing device, having a fixed dial having an axially rotatable indicator and means for setting the counterpoise of the scale for weights in excess of that indicated on said dial, a ring rotatable about said dial independent of the weighing mechanism and having a pointer to register with the weight indicator and having type secured rigidly to its periphery corresponding with the dial markings, a second movable type carrying member operatively connected with said counterpoise setting means, and having type corresponding with the weights to which said counterpoise is set, and means for taking an impression from each of said type carrying members simultaneously.

4. In a dial scale printing device, a fixed dial having an axially rotatable indicator and means for setting the counterpoise of the scale for weights in excess of that indicated on said dial, a type ring rotatably mounted on the frame independent of the scale weighing mechanism having type thereon corresponding with the markings on the dial, a type bar slidably mounted in said frame adjacent to said ring having type thereon corresponding to the weights to which the counterpoise may be set, means operatively connecting said slidable type bar with said counterpoise setting means for sliding said bar to move its type into a corresponding position, and means for taking an impression from the type of said ring and said type bar.

5. In a dial scale printing device, a fixed dial having an axially rotatable indicator and means for setting the counterpoise of the scale for weights in excess of that indicated on said dial, a type ring rotatably mounted on the frame independent of the scale weighing mechanism having type thereon corresponding with the markings on the dial, a type bar slidably mounted in said frame adjacent to said ring having type thereon corresponding to the weights to which the counterpoise may be set, a gear rack on said slidable type bar, a gear quadrant meshing with said rack, means operatively connecting said gear quadrant with said counterpoise setting means to effect the rotation thereof on the setting of said counterpoise to vary the position of the type bar and bring its type into a position corresponding with the setting of said counterpoise, and means for taking an impression from said type members.

MELVIN ARVINE SWEET.
GEORGE WILLIAM BRITTON.